United States Patent [19]
Yokoi et al.

[11] Patent Number: 4,485,197
[45] Date of Patent: Nov. 27, 1984

[54] RESINOUS COMPOSITION AND ANTIFOULING PAINT

[75] Inventors: Junji Yokoi, Nara; Naoki Yamamori, Minoo; Motoyoshi Yoshikawa, Nara, all of Japan

[73] Assignee: Nippon Paint Co., Ltd., Osaka, Japan

[21] Appl. No.: 456,289

[22] Filed: Jan. 6, 1983

[30] Foreign Application Priority Data

Jan. 7, 1982 [JP] Japan .................................... 57-1509

[51] Int. Cl.$^3$ ............................................... C08J 3/00
[52] U.S. Cl. ................................... 523/177; 524/547; 524/807; 526/240
[58] Field of Search ................ 523/177; 524/547, 807; 526/240

[56] References Cited

U.S. PATENT DOCUMENTS 3,236,793  2/1966  Robins et al. ...................... 523/177
4,174,339 11/1979  Matsuda et al. ................... 523/177

Primary Examiner—Joseph L. Schofer
Assistant Examiner—J. M. Reddick
Attorney, Agent, or Firm—Wenderoth, Lind & Ponack

[57] ABSTRACT

Resinous compositions comprising an acrylic resin containing, as polymer constituting units, 20 to 55% by weight of tri-organic tin $\alpha,\beta$-unsaturated carboxylate, 0.1 to 25% by weight of hydroxy bearing (meth)acrylate and the remainder of another polymerizable unsaturated monomer are provided. The compositions are useful as resinous vehicles for antifouling paints, capable of being gradually hydrolyzed in sea water, thereby resulting in a smooth coating surface and liberating an antifouling agent by themselves.

10 Claims, No Drawings

RESINOUS COMPOSITION AND ANTIFOULING PAINT

FIELD OF INVENTION

The present invention relates to an acrylic resinous composition for marine antifouling paint and a paint composition containing the same.

BACKGROUND OF INVENTION

Marine antifouling paints comprising organic or inorganic biocides admixed with resinous binders such as vinylchloride resin, alkyd resin or the like have been widely used. However, since the antifouling effect is dependent, in any case, upon the amount of biocide dissolved out of the coating surface, and the dissolving rate of said biocide is principally based on diffusion phenomenon due to concentration gradient of said toxicant in the coating, a stable and longer term antifouling effect cannot be expected therewith. Furthermore, after the biocide(s) is (are) dissolved of the coating surface, there remains skeleton structure of water-insoluble resinous component which will cause various problems as increase in frictional resistance of the ship bottom to water, lowered speed, increase in fuel consumption and the like.

Under the circumstances, there has moved into the limelight an antifouling paint comprising an antifouling agent and a hydrolyzable type resinous vehicle, which can give a comparatively tough coating whose resin is, under sailing conditions, gradually hydrolyzed and dissolved in sea water. One of the most attractive known hydrolyzable resins used in such application would be an acrylic resin having, as a component, a tri-organic tin $\alpha,\beta$-unsaturated carboxylate. This is because this high molecular weight organic tin polymer can be hydrolyzed in weak alkaline sea water, liberating the tri-organic tin portion therefrom and resulting in a resin with hydrophilic carboxyl groups. In order to give a stable and tough coating, the resin in the coating should preferably be of a high molecular weight with the least possible hydrophilic groups, whereas to give a sufficient dissolution of the resin in water, the content of said hydrophilic groups should be in excess of a defined level. To cope with these two conflicting requirements, there has been a process of preparing a polymer of tri-organic tin $\alpha,\beta$-unsaturated carboxylate and acrylic vinyl monomer, using a comparatively higher concentration of the former and selecting a member with the least possible hydrophilic groups as the latter. In fact, various polymers of acrylic esters, styrene or the like containing 55 to 65% by weight of tri-organic tin $\alpha,\beta$-unsaturated monocarboxylates have been developed and placed on the market. The acrylic vinyl monomers actually polymerized with said organic tin monomers did include those with hydrophilic groups such as acrylic acid. However, acrylic acid was only a part of the polymerizable monomers used, with an understanding that its presence was undesirable in substance, and even in such case, it has been believed that the amount of tri-organic tin $\alpha,\beta$-unsaturated carboxylate should be as high as possible, i.e. in the case of monocarboxylate, at least 55% by weight, to give an adequate water solubility to the hydrolyzed resin. This type of acrylic resin containing as a component a higher concentration of tri-organic tin $\alpha,\beta$-unsaturated carboxylate is indeed quite useful for the intended object since it is gradually hydrolyzed and dissolved in sea water, liberating a tin compound as an antifouling agent. However, from the standpoint of public health, it is of course desired to decrease the amounts of tin compound liberated from said hydrolysis with all possible means. Also, since tri-organic tin compounds are expensive, the reduction of the amount of said ingredient is welcomed from this point of view. And, in the case of antifouling paint comprising a hydrolyzable resinous vehicle, since the coating is gradually decomposed and dissolved in sea water, the desired antifouling effect would be likely attained, without relying on the substance liberated alone, by the inclusion or admixture of other biocides known per se.

With the abovesaid in mind, the inventors have made an endeavor to obtain a resinous composition for antifouling paint comprising a film-forming acrylic polymer containing, as a polymer constituting unit, a tri-organic tin $\alpha,\beta$-unsaturated carboxylate, the content of said tin carboxylate being cut as much as possible and at least to the level of not more than 55% by weight, and still exhibiting an excellent film-forming property and the same extent of polishing effect as attained with heretofore known antifouling paints of this type, and have finally come to the present invention.

SUMMARY OF THE INVENTION

An object of the invention is, therefore, to provide an acrylic resinous composition for antifouling paint, with a lower than conventional amount of tin carboxylate component, and capable of being gradually hydrolyzed in weak alkaline condition as in sea water. Another object of the invention is to provide an antifouling paint with said resinous composition, capable of giving a tough coating, being gradually hydrolyzed and dissolved in sea water, and resulting in, with the progress of said hydrolysis, a smooth surface coating and an excellent antifouling effect. Other objects of the invention will become apparent from the following description of the specification and claims.

These and other objects of the invention shall be attained with a resinous composition for antifouling paint comprising an acrylic polymer containing, as polymer constituting units, 20 to 55% by weight of tri-organic tin $\alpha,\beta$-unsaturated carboxylate, 0.1 to 25% by weight of hydroxyl bearing (meth)acrylate, and the remainder of another polymerizable unsaturated monomer.

The invention also provides an antifouling paint comprising as vehicle the abovesaid resinous composition, and an organic solvent, together with other optional antifouling agents and coloring matter.

DESCRIPTION OF THE PREFERRED EMBODIMENTS

The present resinous composition comprising an acrylic polymer containing as its constituting units, defined amounts of tri-organic tin $\alpha,\beta$-unsaturated carboxylate, hydroxyl bearing (meth)acrylate and other polymerizable unsaturated monomers, may be prepared by either direct or indirect polymerization techniques.

In the former method, defined amounts of each monomer are directly polymerized according to normal procedure in an inert organic solvent at an elevated temperature in the presence of initiator such as peroxide, azobisisobutyronitrile or the like. At this time, as the tri-organic tin $\alpha,\beta$-unsaturated monocarboxylate, use can be made of such members as, for example, trialkyl tin- or triphenyl tin-acrylate, methacrylate, crotonate and the like, and as the hydroxyl bearing (meth)acrylate, 2-hydroxyethyl acrylate, 2-hydroxyethyl methacrylate, hydroxypropyl methacrylate, hydroxypropyl acrylate and the like. The third monomer may be any polymerizable unsaturated compounds such as, for example, methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, isobutyl methacrylate, n-hexyl methacrylate, acrylamide, styrene, vinyl toluene, acrylonitrile and the like.

Alternatively, said polymer may be prepared by the indirect, two-step method. That is, the defined amounts of $\alpha,\beta$-unsaturated monocarboxylic acid such as, for example, acrylic acid, methacrylic acid, crotonic acid and the like are first reacted with the defined amounts of hydroxyl bearing (meth)acrylate as exemplified hereinabove to obtain a polymer having both free carboxyl and hydroxyl groups, which is then copolymerized with a reactive tri-organic tin compound such as, for example, hydroxide, halide, or oxide of triphenyl or trialkyl tin. The details of such reactions are apparent to those skilled in the art to which the present invention is directed and hence there is no need of giving full explanation of the same.

In the preparation of the present resinous composition comprising an acrylic polymer containing tri-organic tin $\alpha,\beta$-unsaturated dicarboxylate, hydroxyl bearing (meth)acrylate and other polymerizable unsaturated monomers, the so-called direct, one step method may be rather useless, because it is difficult to incorporate into the polymer chain, the abovesaid organic tin carboxylate component effectively, and hence, preference may be given to the second indirect method. That is, in the first step, a polymer having both carboxyl and hydroxyl groups is prepared by using a $\alpha,\beta$-unsaturated dicarboxylic acid such as itaconic acid, maleic acid, fumaric acid and the like, and a hydroxyl bearing (meth)acrylate, and to this, a reactive tri-organic tin compound is reacted to give the objective polymer. In either case, one or more of the exemplified members may be used for the respective monomers, and the third component of polymerizable unsaturated monomer may be appropriately selected in due consideration of the film performance such as, for example, toughness and the like.

Apart from the particulars of said preparations, it is essential that the acrylic polymer of the present invention be composed of 20 to 55% by weight of tri-organic tin $\alpha,\beta$-unsaturated carboxylate, 0.1 to 25% by weight of hydroxyl bearing (meth)acrylate and the remaining amount of another polymerizable unsaturated monomer. As already stated, in the case of heretofore known acrylic resinous vehicles containing as a polymer constituting unit, a tri-organic tin $\alpha,\beta$-unsaturated monocarboxylate, it has been believed that for the effective hydrolysis and dissolution of the formed coating, it is essential that the content of said tin carboxylate in the resin should be more than 55% by weight.

However, it has now been found by the inventors that if a particular component, i.e. hydroxyl bearing (meth)acrylate, is introduced, as a polymer constituting unit, in said acrylic polymer, even if the weight ratio of said organic tin component is cut to a lower level, resins of very similar performance as those of heretofore known organic tin containing acrylic resins can be obtained. In the most widely used organic tin containing acrylic resins for antifouling paint, an average molecular weight of said resin is in general in a range of about 3,000 to 50,000, and preferably 6,000 to 20,000, and when coated and dried, the formed coating will be depleted at the rate of about $20\sim 80\mu$ a year.

By the introduction of an amount of hydroxyl groups in said acrylic resins, it may be possible to make the resins water soluble by the interaction between said hydroxyl groups and carboxyl groups to be generated by the hydrolysis of the organic tin ester portion of the resins. However, too large a quantity of hydroxyl groups might be unwarrantable because of causing undesirable swelling, lowering the toughness of the coating and, in an extreme case, making the resin fully soluble after all. On the other hand, it is of course advantageous to decrease the amount of organic tin ester component in the resin as much as practicable, although there is, as a matter of course, a limit insofar as maximum toughness and film-forming property are desired for said resin before hydrolysis and adequate water solubility after hydrolysis by making use of carrboxylic groups generated therefrom. The inventors, having conducted an extensive study of the correlation between the amounts of organic tin $\alpha,\beta$-unsaturated carboxylate and/or hydroxyl bearing (meth)acrylate to be incorporated in the acrylic polymer as constituting units, and the hydrolysis rate, erosion rate, and stability of the film, have found that an excellent hydrolyzable resinous composition for antifouling paint, which can stand comparison in regard to coating performance and erosion rate with known organic tin containing acrylic resinous compositions, is obtainable by the inclusion, as polymer constituting units, of 20 to 55% by weight, preferably 35 to 50% by weight, of tri-organic tin $\alpha,\beta$-unsaturated carboxylate and 0.1 to 25% by weight, preferably 0.5 to 20% by weight, of hydroxyl bearing (meth)acrylate, and on the basis of this finding, have completed the invention. The present inventors also have found that even in the case of an acrylic polymer containing a tri-organic tin $\alpha,\beta$-unsaturated dicarboxylate, the abovesaid is likewise applicable, though the actual amount expressed in terms of molar ratio is one half that of the monocarboxylate because of the nature thereof.

Thus, in the present resinous composition, the organic tin content is greatly reduced as compared with those of heretofore known compositions, and nevertheless, when coated, a tough coating can be formed, which is gradually hydrolyzed in sea water and subjected to erosive polishing in an adequate rate. Therefore, the composition is quite useful as a resinous vehicle in an antifouling paint.

The present invention also includes an antifouling paint comprising the abovesaid resinous composition as a vehicle having the potential of an antifouling agent. Since the resin can liberate, through hydrolysis, an amount of antifouling tri-organic tin compound, no additional biocide may be required under certain circumstances. However, for obtaining an enhanced antifouling effect, it is generally advisable to incorporate additional biocide which may be any of the known organic and inorganic antifouling agents, such as, for example, metallic copper, copper compounds (e.g. cupric hydroxide, cuprous oxide, cuprous thiocyanate), tributyl tin compounds (e.g. bistributyl tin oxide, tributyl tin fluoride, tributyl tin $\alpha,\alpha'$-dibromosuccinate), triphenyl tin compounds (e.g. triphenyl tin hydroxide, triphenyl tin fluoride, triphenyl tin chloride, triphenyl tin α,α'-dibromosuccinate) and sulfur compounds (e.g. tetramethyl thiuram disulfide, zinc dimethyl dithiocarbamate, manganese ethylene bisdithiocarbamate, zinc ethylene bisdithiocarbamate).

In preparing an antifouling paint of this invention, the abovesaid resinous composition is diluted with an organic solvent, to which other optional antifouling agents, coloring matter and the like may be added and mixed well as desired. Any of the common organic solvents such as alcohols, ketones, aromatic hydrocarbons, chlorinated hydrocarbons and the like may satisfactorily be used, and the solid content is adjusted to within an appropriate range in consideration of application, workability or the like. No particular condition is required for the preparation of the paint composition, and any of the conventional techniques may satisfactorily be used therefor.

Thus obtained antifouling paint can be applied by any conventional means such as spraying, brushing, roll coating and the like, to a ship bottom, marine structure and the like. The coating is quite tough, and its surface becomes more and more smooth and flat with sailing, and the antifouling effect continues to last for a longer period of time compared with those of conventional paints based on tri-organic tin acrylic resinous compositions.

The invention shall now be more fully explained in the following examples. Unless otherwise stated, % and parts are by weight.

EXAMPLES 1–12

Into a four-necked flask equipped with a reflux condenser, a dropping funnel and a stirrer, were placed 50 parts of xylene, 30 parts of methylisobutyl ketone and 20 parts of n-butanol, and the mixture was maintained at 80°–100° C. To this solution, was added dropwise a mixed solution of 50 parts of tributyl tin methacrylate, 48 parts of methyl methacrylate, 2 parts of 2-hydroxyethyl acrylate and 1.4 parts of azo bis-isobutyronitrile over 4 hours, and thereafter, the mixture was kept at the same temperature for 2 hours to obtain varnish A (solid content 50.3%, Gardner viscosity N, and number average molecular weight of the resin 11,000).

Using the same procedures as stated hereinabove, the following varnishes B to L were prepared (see Table 1).

TABLE 1

| Example No. | varnish | Solvent (parts) | monomer (parts) | initiator (parts) | solid content % | Gardner viscosity | numb. average molec. weight |
|---|---|---|---|---|---|---|---|
| 2 | B | xylene (50) methylisobutyl ketone (30) n-butanol (20) | tributyl tin methacrylate (40) ethyl methacrylate (30) styrene (10) methyl acrylate (10) 2-hydroxyethyl methacrylate (10) | azobisisobutyronitrile (1.4) | 49.4 | R | 13,000 |
| 3 | C | xylene (50) methylisobutyl ketone (30) n-butanol (20) | tributyl tin methacrylate (50) methyl methacrylate (10) styrene (10) methyl acrylate (10) 2-hydroxyethyl methacrylate (20) | azobisisobutyronitrile (1.4) | 49.5 | P | 12,000 |
| 4 | D | xylene (50) methylisobutyl ketone (30) n-butanol (20) | tributyl tin methacrylate (40) methyl methacrylate (10) styrene (10) ethyl acrylate (20) 2-hydroxyethyl methacrylate (20) | azobisisobutyronitrile (1.4) | 49.2 | O | 11,000 |
| 5 | E | xylene (100) | tributyl tin methacrylate (55) methyl methacrylate (40) 2-hydroxyethyl acrylate (5) | azobisisobutyronitrile (1.4) | 50.3 | R | 9,800 |
| 6 | F | xylene (100) | tributyl tin methacrylate (45) methyl methacrylate (45) 2-hydroxyethyl acrylate (10) | azobisisobutyronitrile (1.4) | 49.7 | U | 15,000 |
| 7 | G | xylene (100) | tributyl tin methacrylate (45) isobutyl methacrylate (20) 2-hydroxyethyl methacrylate (15) ethyl acrylate (20) | azobisisobutyronitrile (1.4) | 49.3 | S | 14,000 |
| 8 | H | xylene (100) | tributyl tin methacrylate (45) methyl methacrylate (40) hydroxylpropyl methacrylate (15) | azobisisobutyronitrile (1.4) | 49.5 | R | 12,000 |
| 9 | I | xylene (80) n-butanol (20) | tributyl tin methacrylate (40) methyl methacrylate (45) 2-hydroxyethyl acrylate (15) | azobisisobutyronitrile (1.4) | 50.1 | V | 16,000 |
| 10 | J | xylene (80) n-butanol (20) | tributyl tin methacrylate (35) methyl methacrylate (45) 2-hydroxyethyl methacrylate (20) | azobisisobutyronitrile (1.4) | 49.3 | M | 9,500 |
| 11 | K | xylene (100) | tributyl tin methacrylate (48) methyl methacrylate (49) 2-hydroxyethyl acrylate (3) | azobisisobutyronitrile (1.4) | 49.6 | R | 12,000 |
| 12 | L | xylene (100) | tributyl tin methacrylate (50) methyl methacrylate (28) 2-hydroxyethyl acrylate (2) 2-ethylhexyl acrylate (20) | azobisisobutyronitrile (1.4) | 49.5 | N | 10,000 |

EXAMPLES 13–15

Into the same four-necked flask as stated in Example 1, were added 40 parts of xylene, 30 parts of methyl isobutyl ketone and 30 parts of n-butanol, and the mixture was maintained at 80°–100° C. To this solution, was added dropwise over 4 hours a mixed solution of 20 parts of methacrylic acid, 60 parts of methyl methacrylate, 15 parts of styrene, 5 parts of 2-hydroxyethyl methacrylate and 1.4 parts of azobisisobutyronitrile, and thereafter, the mixture was kept at the same temperature for 2 hours and then allowed to cool to 70° C. Next, the mixture was combined with 70 parts of xylene and 70 parts of bistributyl tin oxide, and stirred at 100° C. for 2 hours. An amount of water generated from said esterification was azeotropically removed from the system by vacuum distillation and after reaching the point that a clear resinous solution was obtained, vacuum distillation of solvent was continued at a resinous solution temperature of less than 100° C. for an additional 10 minutes. The same amounts of xyelene as distilled out were added to obtain varnish M (solid content 50.4%, Gardner viscosity P, number average molecular weight of the resin 9,500).

Using the same procedures as stated hereinabove, the following varnishes N-O were prepared. (see Table 2)

temperature for 2 hours and then allowed to cool to 70° C. Thereafter, 45 parts of xylene and 46 parts of bistributyl tin oxide were added and the formed water was removed and xylene was added as in Example 13 to obtain varnish P (solid content 50.1%, Gardner viscosity R, number average molecular weight of the resin 8,800).

Using the materials listed in the following Table 3, varnishes Q to T were prepared in the same way.

For comparison, the following varnishes 1 to 4 were prepared according to the procedures of the foregoing Examples.

COMPARATIVE VARNISH 1

The procedures of Example 1 were repeated except using 40 parts of xylene, 65 parts of tributyl tin methacrylate, 35 parts of methyl methacrylate and 1.6 parts of azobisisobutyronitrile to obtain varnish 1. This is a known resinous varnish for antifouling paint now being used practically.

TABLE 2

| Exam. No. | varnish | Solvent (parts) | Monomer (parts) | initiator (parts) | Tin compound (parts) solvent (parts) | solid content % | Gardner viscosity | Number aver. molec. weight |
|---|---|---|---|---|---|---|---|---|
| 14 | N | xylene (40) methylisobutyl ketone (30) butanol (30) | methacrylic acid (10) methyl methacrylate (40) methyl acrylate (25) 2-hydroxyethyl methacrylate (15) styrene (10) | azobisisobutyronitrile (1.4) | bistributyl tin oxide (35) xylene (35) | 49.2 | P | 10,000 |
| 15 | O | xylene (40) methylisobutyl ketone (30) n-butanol (30) | methacrylic acid (15) methacrylate (40) ethyl acrylate (10) 2-hydroxyethyl methacrylate (20) sytrene (15) | azobisisobutyronitrile (1.4) | bis tributyl tin oxide (52) xylene (50) | 50.0 | S | 10,000 |

EXAMPLES 16-20

Into the same four-necked flask as stated in Example 1, were added 20 parts of xylene, 30 parts of methyl isobutyl ketone and 30 parts of n-butanol, and the mixture was maintained at 90°-100° C. To this, was added dropwise over 6 hours a mixed solution of 10 parts of itaconic acid, 10 parts of methyl methacrylate, 15 parts of methyl acrylate, 20 parts of styrene, 20 parts of n-butyl methacrylate, 15 parts of 2-hydroxyethylacrylate, 10 parts of n-butanol and 1.6 parts of azobisisobutyronitrile. After 1 hour from the completion of said addition, a solution of 10 parts of methylisobutyl ketone and 0.3 part of azobisisobutyronitrile was dropwise added over 2 hours, and the mixture was maintained at the same

COMPARATIVE VARNISH 2

The procedures of Example 1 were repeated by using 40 parts of xylene, 40 parts of tributyl tin methacrylate, 60 parts of methyl methacrylate, and 1.6 parts of azobisisobutyronitrile to obtain varnish 2.

COMPARATIVE VARNISH 3

The procedures of Example 1 were repeated by using 40 parts of xylene, 20 parts of tributyl tin methacrylate, 60 parts of methyl methacrylate, 10 parts of methyl acrylate, 10 parts of vinyl acetate and 1.6 parts of azobisisobutyronitrile to obtain varnish 3.

TABLE 3

| Exam. No. | varnish | Solvent (parts) | Monomer (parts) | initiator (parts) | Tin compound (parts) solvent (parts) | solid content % | Gardner viscosity | Number aver. molec. weight |
|---|---|---|---|---|---|---|---|---|
| 17 | Q | xylene (20) methylisobutyl ketone (30) n-butanol (30) | maleic acid (8) methyl methacrylate (30) styrene (20) n-butyl methacrylate (22) hydroxypropyl acrylate (20) | azobisisobutyronitrile (1.6) n-butanol (10) azobisisobutyronitrile (0.3) methyl isobutyl ketone (10) | bistributyl tin oxide (42) xylene (40) | 49.2 | T | 9,000 |
| 18 | R | xylene (20) methylisobutyl ketone (30) n-butanol (30) | itaconic acid (15) methyl methacrylate (30) styrene (25) n-butyl methacrylate (27) 2-hydroxyethyl methacrylate (3) | azobisisobutyronitrile (1.6) n-butanol (10) azobisisobutyronitril (0.3) methyl isobutyl ketone (10) | bis tributyl tin oxide (70) xylene (65) | 49.7 | N | 8,500 |
| 19 | S | xylene (30) methylisobutyl ketone (30) | fumaric acid (5) methyl methacrylate (20) styrene (20) | azobisisobutyronitrile (1.6) n-butanol (10) | bistributyl tin oxide (27) xylene (25) | 48.8 | V | 9,300 |

TABLE 3-continued

| Exam. No. | var- nish | Solvent (parts) | Monomer (parts) | initiator (parts) | Tin compound (parts) solvent (parts) | solid content % | Gardner viscosity | Number aver. molec. weight |
|---|---|---|---|---|---|---|---|---|
| | | n-butanol (20) | ethyl acrylate (10) n-butyl methacrylate (15) hydroxypropyl methacrylate (30) | azobisisobutyronitrile (0.3) methyl isobutyl ketone (10) | | | | |
| 20 | T | xylene (20) methylisobutyl ketone (30) n-butanol (30) | itaconic acid (15) methyl methacrylate (20) styrene (25) ethyl acrylate (10) n-butyl methacrylate (20) 2-hydroxyethyl methacrylate (10) | azobisisobutyronitrile (1.6) n-butanol (10) azobisisobutyronitrile (0.3) methyl isobutyl ketone (0.6) | bis tributyl tin oxide (42) xylene (40) | 49.0 | P | 8,500 |

COMPARATIVE VARNISH 4

In a solvent mixture of 20 parts of xylene, 30 parts of methylisobutyl ketone and 30 parts of n-butanol, were reacted 15 parts of itaconic acid, 35 parts of methyl methacrylate, 10 parts of styrene, and 50 parts of n-butyl methacrylate in the presence of 1.6 parts of azobisisobutyronitrile and 10 parts of n-butanol. To this, were added 0.3 part of azobisisobutyronitrile and 10 parts of methyl isobutyl ketone, and copolymerization was continued. Thereafter, 70 parts of bistributyl tin oxide and 65 parts of xylene were added and reacted to obtain varnish 4.

EROSIVE DISSOLUTION TEST AND RESULTS

Resinous varnishes of Examples 1 to 20 and Comparative varnishes 1 to 4 were applied onto test plates so as to give a dry thickness of 100μ. These test plates were attached to a Discrotor, which was rotated in sea water (18° to 23° C.) at a constant speed (peripheral speed of about 35 knots) for 60 days (days and nights). Depletion rate of the respective coatings was determined by measuring the film thickness in the initial and final stages using a microscope.

$$\text{Depletion rate} = \frac{\text{initial film thickness} - \text{final film thickness}}{\text{initial film thickness}}$$

The results are shown in the following Table 4.

TABLE 4

| | Depletion rate | | |
|---|---|---|---|
| Test varnish Example varnish | Depletion rate | Test varnish Example varnish | Depletion rate |
| 1 | A | 0.21 | 13 | M | 0.28 |
| 2 | B | 0.18 | 14 | N | 0.15 |
| 3 | C | 0.37 | 15 | O | 0.13 |
| 4 | D | 0.19 | 16 | P | 0.14 |
| 5 | E | 0.31 | 17 | Q | 0.16 |
| 6 | F | 0.30 | 18 | R | 0.23 |
| 7 | G | 0.36 | 19 | S | 0.11 |
| 8 | H | 0.28 | 20 | T | 0.36 |
| 9 | I | 0.26 | Compar. | 1 | 0.32 |
| 10 | J | 0.24 | Compar. | 2 | <0.01 |
| 11 | K | 0.34 | Compar. | 3 | <0.01 |
| 12 | L | 0.36 | Compar. | 4 | <0.01 |

From the foregoing, it is very clear that the coatings obtained by using the present resinous compositions are subjected to hydrolysis and erosion polishing in sea water under sailing conditions and are depleted at an appropriate rate.

EXAMPLES 21–40 AND COMPARATIVE EXAMPLES 1–4

Into a sand grind mill, were added 45 parts of resinous varnish A obtained in Example 1, 35 parts of cuprous oxide, 10 parts of zinc oxide and 10 parts of xylene, and the mixture was ground and mixed well to give a dispersion having an average grain diameter of 50μ. The total weight was adjusted, while measuring the solid content, to 100 parts by adding an amount of solvent equivalent to the evaporated, and thus an antifouling paint was prepared.

Using the same procedures as stated hereinabove, various antifouling paints were prepared by using the materials listed in the following Table 5 (Examples of the present invention) and Table 6 (Comparative Examples).

TABLE 5

| Description of antifouling paint | | | | | |
|---|---|---|---|---|---|
| Example No. | 21 | 22 | 23 | 24 | 25 |
| Paint No. | 1 | 2 | 3 | 4 | 5 |
| resinous varnish A | 45 | | | | |
| resinous varnish B | | 30 | | | |
| resinous varnish C | | | 45 | | |
| resinous varnish D | | | | 60 | |
| resinous varnish E | | | | | 60 |
| cuprous oxide | 35 | 40 | | | 10 |
| cuprous thiocyanate | | | 10 | 20 | |
| triphenyl tin hydroxide | | 6 | 4 | | 4 |
| zinc dimethyl dithiocarbamate | | | | | 10 |
| zinc oxide | 10 | | 20 | 8 | 10 |
| red oxide | | 4 | | 4 | 2 |
| phthalocyanine blue | | | | | |
| butanol | | | 6 | | |
| methyl isobutyl ketone | | 10 | 15 | 8 | 4 |
| xylene | 10 | 10 | | | |
| Total | 100 | 100 | 100 | 100 | 100 |
| Example No. | 26 | 27 | 28 | 29 | 30 |
| Paint No. | 6 | 7 | 8 | 9 | 10 |
| resinous varnish F | 45 | | | | |
| resinous varnish G | | 45 | | | |
| resinous varnish H | | | 40 | | |
| resinous varnish I | | | | 40 | |
| resinous varnish J | | | | | 45 |
| cuprous oxide | 35 | | 32 | 50 | 30 |
| cuprous thiocyanate | | 10 | | | |
| triphenyl tin hydroxide | | 4 | 8 | | |
| zinc dimethyl dithiocarbamate | | | | | |
| zinc oxide | 10 | 20 | | | 10 |
| red oxide | | | 5 | | 5 |
| phthalocyanine blue | | 3 | | | |
| butanol | | | | 3 | |
| methyl isobutyl ketone | | | 5 | | |
| xylene | 10 | 18 | 10 | 7 | 10 |
| Total | 100 | 100 | 100 | 100 | 100 |
| Example No. | 31 | 32 | 33 | 34 | 35 |

TABLE 5-continued

| Description of antifouling paint | | | | | |
|---|---|---|---|---|---|
| Paint No. | 11 | 12 | 13 | 14 | 15 |
| resinous varnish K | 45 | | | | |
| resinous varnish L | | 50 | | | |
| resinous varnish M | | | 55 | | |
| resinous varnish N | | | | 40 | |
| resinous varnish O | | | | | 80 |
| cuprous oxide | | | 15 | 50 | |
| cuprous thiocyanate | 5 | | | | |
| triphenyl tin hydroxide | | 15 | | | |
| zinc dimethyl dithiocarbamate | 15 | 5 | | | |
| zinc oxide | 15 | 20 | 20 | | |
| red oxide | | | | | |
| phthalocyanine blue | | 3 | 3 | | 4 |
| butanol | | | | | |
| methyl isobutyl ketone | | | | | |
| xylene | 20 | 7 | 7 | 10 | 16 |
| Total | 100 | 100 | 100 | 100 | 100 |
| Example No. | 36 | 37 | 38 | 39 | 40 |
| Paint No. | 16 | 17 | 18 | 19 | 20 |
| resinous varnish P | 70 | | | | |
| resinous varnish Q | | 35 | | | |
| resinous varnish R | | | 35 | | |
| resinous varnish S | | | | 45 | |
| resinous varnish T | | | | | 45 |
| cuprous oxide | | | 45 | | 30 |
| cuprous thiocyanate | | | | 5 | |
| triphenyl tin hydroxide | 15 | | 4 | | |
| zinc dimethyl dithiocarbamate | | 20 | | 15 | |
| zinc oxide | | 15 | | 15 | 5 |
| red oxide | | | | | 5 |
| phthalocyanine blue | 2 | 5 | | | |
| butanol | | 5 | | | |
| methyl isobutyl ketone | | 15 | 8 | 20 | 10 |
| xylene | 13 | 5 | 8 | | 5 |
| Total | 100 | 100 | 100 | 100 | 100 |

TABLE 6

| Description of antifouling paints | | | | |
|---|---|---|---|---|
| Compar. Example No. | 1 | 2 | 3 | 4 |
| Compar. paint No. | 1 | 2 | 3 | 4 |
| Compar. varnish 1 | 35 | | | |
| Compar. varnish 2 | | 35 | | |
| Compar. varnish 3 | | | 45 | |
| Compar. varnish 4 | | | | 40 |
| cuprous oxide | 40 | 20 | | 40 |
| cuprous thiocyanate | | 25 | 25 | |
| triphenyl tin hydroxide | | | | 5 |
| zinc oxide | 5 | 10 | | |
| red oxide | 3 | 3 | | 3 |
| titanium oxide | | | | 8 |
| methylisobutyl ketone | 7 | | 15 | 4 |
| xylene | 10 | 7 | 15 | |
| Total | 100 | 100 | 100 | 100 |

Onto a sand-blasted steel plate (100×300×1.6 mm) previously coated with an anticorrosive paint, the respective paints were applied twice by brushing so as to give a coating of 100μ dry thickness each time. The test plates thus obtained were immersed in sea water for a defined period of time and the antifouling effects were evaluated. The test was conducted at Aioi Bay, Hyogo Prefecture. The test results are shown in Table 7. From this Table, it is clear that the present antifouling paints can exhibit excellent antifouling effects constantly for a longer period of time.

TABLE 7

| Antifouling test results (surface area in % covered with marine animals and plants) | | | | | |
|---|---|---|---|---|---|
| immersion months | 3 | 6 | 12 | 18 | 24 |
| Paint No. 1 | 0 | 0 | 0 | 0 | 0 |
| 2 | 0 | 0 | 0 | 0 | 0 |
| 3 | 0 | 0 | 0 | 0 | 0 |
| 4 | 0 | 0 | 0 | 0 | 0 |
| 5 | 0 | 0 | 0 | 0 | 0 |
| 6 | 0 | 0 | 0 | 0 | 0 |
| 7 | 0 | 0 | 0 | 0 | 0 |
| 8 | 0 | 0 | 0 | 0 | 0 |
| 9 | 0 | 0 | 0 | 0 | 0 |
| 10 | 0 | 0 | 0 | 0 | 0 |
| 11 | 0 | 0 | 0 | 0 | 0 |
| 12 | 0 | 0 | 0 | 0 | 0 |
| 13 | 0 | 0 | 0 | 0 | 0 |
| 14 | 0 | 0 | 0 | 0 | 0 |
| 15 | 0 | 0 | 0 | 0 | 0 |
| 16 | 0 | 0 | 0 | 0 | 0 |
| 17 | 0 | 0 | 0 | 0 | 0 |
| 18 | 0 | 0 | 0 | 0 | 0 |
| 19 | 0 | 0 | 0 | 0 | 10 |
| 20 | 0 | 0 | 0 | 0 | 0 |
| Compar. Paint 1 | 0 | 0 | 0 | 0 | 0 |
| 2 | 0 | 15 | 60 | 100 | 100 |
| 3 | 0 | 0 | 50 | 100 | 100 |
| 4 | 0 | 0 | 30 | 80 | 100 |

What is claimed is:

1. A resinous composition for an antifouling paint comprising an acrylic resin containing, as polymer constituting units, 20 to 55% by weight of a tri-organic tin α,β-unsaturated carboxylate, and 0.1 to 25% by weight of a hydroxyl bearing (meth)acrylate wherein the hydroxyl bearing (meth)acrylate is 2-hydroxyethyl methacrylate, 2-hydroxyethyl acrylate, hydroxypropyl acrylate or hydroxypropyl methacrylate, the remainder of the polymer constituting units being another different polymerizable unsaturated monomer selected from the group consisting of alkylacrylates, alkylmethacrylates, acrylamides, styrene, vinyl toluene and acrylonitrile.

2. A composition according to claim 1 wherein the tri-organic tin α,β-unsaturated carboxylate is trialkyl tin (meth)acrylate.

3. A composition according to claim 2 wherein the trialkyl tin (meth)acrylate is tributyl tin methacrylate.

4. A composition according to claim 1 wherein the tri-organic tin α,β-unsaturated carboxylate is triphenyl tin (meth)acrylate.

5. A composition according to claim 1 wherein the tri-organic tin α,β-unsaturated carboxylate is trialkyl- or triphenyl-tin maleate, itaconate or fumarate.

6. An antifouling paint comprising, as resinous vehicle, the resinous composition of claim 1.

7. An antifouling paint comprising, as resinous vehicle, the resinous composition of claim 2.

8. An antifouling paint comprising, as resinous vehicle, the resinous composition of claim 3.

9. An antifouling paint comprising, as resinous vehicle, the resinous composition of claim 4.

10. An antifouling paint comprising, as resinous vehicle, the resinous composition of claim 5.

* * * * *